(12) United States Patent
Kono

(10) Patent No.: US 10,443,735 B2
(45) Date of Patent: Oct. 15, 2019

(54) BRUSH SEAL

(71) Applicant: EAGLE INDUSTRY CO., LTD., Tokyo (JP)

(72) Inventor: Toru Kono, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 24 days.

(21) Appl. No.: 15/542,359

(22) PCT Filed: Jan. 26, 2016

(86) PCT No.: PCT/JP2016/052141
§ 371 (c)(1),
(2) Date: Jul. 7, 2017

(87) PCT Pub. No.: WO2016/121740
PCT Pub. Date: Aug. 4, 2016

(65) Prior Publication Data
US 2018/0274681 A1    Sep. 27, 2018

(30) Foreign Application Priority Data

Jan. 29, 2015    (JP) .................................. 2015-015231

(51) Int. Cl.
*F16J 15/32*    (2016.01)
*F16J 15/3288*    (2016.01)
(Continued)

(52) U.S. Cl.
CPC ........... *F16J 15/3288* (2013.01); *F01D 11/00* (2013.01); *F01D 11/003* (2013.01); *F01D 25/00* (2013.01);
(Continued)

(58) Field of Classification Search
CPC .... F16J 15/3284; F16J 15/3288; F01D 11/00; F01D 11/003; F01D 25/00; F02C 7/28; F05D 2240/56
See application file for complete search history.

(56) References Cited

U.S. PATENT DOCUMENTS 5,066,024 A * 11/1991 Reisinger ................. A46D 3/05
277/355
6,196,550 B1 * 3/2001 Arora .................... F16J 15/3288
277/355
(Continued)

FOREIGN PATENT DOCUMENTS

EP    1241384    9/2002    ............... F16J 15/32
EP    2824370    1/2015    ............... F16J 15/22
(Continued)

OTHER PUBLICATIONS

International Search Report issued in corresponding PCT Application U.S. Appl. No. PCT/JP2016/052141 dated Apr. 15, 2016 with English translation (6 pages).
(Continued)

*Primary Examiner* — Gilbert Y Lee
(74) *Attorney, Agent, or Firm* — Hayes Soloway P.C.

(57) ABSTRACT

A brush seal having an annular shape, includes: a low-pressure-side plate including a low-pressure-side recessed portion radially recessed and circumferentially extending; a high-pressure-side plate including a high-pressure-side recessed portion positioned to face the low-pressure-side recessed portion, the high-pressure-side recessed portion being radially recessed and circumferentially extending; a brush body including a plurality of wire rods and supported between the low-pressure-side plate and the high-pressure-side plate; and a fixing member inserted into a space formed
(Continued)

by the low-pressure-side recessed portion and the high-pressure-side recessed portion.

17 Claims, 8 Drawing Sheets

(51) Int. Cl.
  *F01D 11/00* (2006.01)
  *F01D 25/00* (2006.01)
  *F02C 7/28* (2006.01)
  *F16J 15/22* (2006.01)
(52) U.S. Cl.
  CPC ............... *F02C 7/28* (2013.01); *F16J 15/22* (2013.01); *F05D 2240/56* (2013.01)

(56) References Cited

U.S. PATENT DOCUMENTS

| | | | | |
|---|---|---|---|---|
| 6,364,316 | B1* | 4/2002 | Arora | F16J 15/3288 |
| | | | | 277/355 |
| 7,516,962 | B2* | 4/2009 | Boeck | F01D 11/001 |
| | | | | 277/355 |
| 7,909,334 | B2* | 3/2011 | Beichl | F01D 11/001 |
| | | | | 277/355 |
| 9,841,104 | B2 | 12/2017 | Uehara et al. | F16J 15/32 |
| 2002/0020968 | A1* | 2/2002 | Gail | F16J 15/3288 |
| | | | | 277/355 |
| 2002/0130469 | A1 | 9/2002 | Kono | F16J 15/44 |
| 2004/0150165 | A1* | 8/2004 | Grondahl | F16J 15/3292 |
| | | | | 277/355 |
| 2005/0040602 | A1* | 2/2005 | Beichl | F16J 15/3288 |
| | | | | 277/355 |
| 2005/0151323 | A1* | 7/2005 | Addis | F16J 15/3288 |
| | | | | 277/355 |
| 2007/0252336 | A1* | 11/2007 | Grabeldinger | F01D 11/025 |
| | | | | 277/355 |
| 2009/0315272 | A1* | 12/2009 | Kasahara | F01D 11/003 |
| | | | | 277/355 |
| 2011/0200432 | A1* | 8/2011 | Alamsetty | F16J 15/3288 |
| | | | | 415/230 |
| 2013/0234397 | A1 | 9/2013 | Uehara et al. | F16J 15/32 |
| 2015/0061228 | A1* | 3/2015 | Stiehler | F01D 11/00 |
| | | | | 277/355 |
| 2015/0167483 | A1 | 6/2015 | Inoue | F01D 11/00 |

FOREIGN PATENT DOCUMENTS

| | | | |
|---|---|---|---|
| EP | 2837858 | 2/2015 | ............ F16J 15/22 |
| JP | 2002/267023 | 9/2002 | ............ A46B 9/08 |
| JP | 2008/121512 | 5/2008 | ............ F01D 11/00 |
| JP | 2012189158 | 10/2012 | ............ F04B 39/00 |
| JP | 2013/155784 | 8/2013 | ............ F01D 11/00 |
| KR | 20010112379 | 12/2001 | |
| KR | 20140110045 | 9/2014 | |
| WO | WO2013/132936 | 9/2013 | ............ F01D 11/00 |
| WO | WO2013/153867 | 10/2013 | ............ F01D 11/00 |

OTHER PUBLICATIONS

Written Opinion of the International Search Authority issued in corresponding PCT Application Serial No. PCT/JP2016/052141 dated Apr. 15, 2016 (4 pages).
Korean Office Action (w/translation) issued in application No. 10-2017-7019794, dated Apr. 5, 2018 (11 pgs).
International Preliminary Report on Patentability issued in application No. PCT/JP2016/052141, dated Aug. 10, 2017 (7 pgs).
Korean Office Action (w/translation) issued in application No. 10-2017-7019794, dated Aug. 30, 2018 (10 pgs).
Japanese Office Action (w/translation) issued in application No. 2016-572048, dated Jul. 2, 2019 (8 pgs).

* cited by examiner (b)

(c)

(a)

(b) CROSS-SECTION ALONG A-A (c) CROSS-SECTION ALONG B-B (a)

(b)

BRUSH SEAL

TECHNICAL FIELD

The present invention relates to a brush seal for sealing a clearance between two members, rotating relative to each other, of a rotating machine such as a turbine.

BACKGROUND ART

A seal is used in a rotating machine such as a turbine in order to prevent gas from leaking along a circumference of a rotor from a high-pressure side to a low-pressure side. The seal is expected to perform a sealing ability in accordance with variations of a clearance between a stator and the rotor of the rotating machine or in accordance with an axial runout between the stator and the rotor. From this aspect, a brush seal made of a bunch of ultrathin wires has been adopted instead of a labyrinth seal.

As shown in FIG. 7, a conventional brush seal 100 mainly includes: a brush body 104 which is formed by a brush 104a made of a bunch of ultrathin wires and an attachment portion 104b to which the brush 104a is welded; a low-pressure-side plate 102; and a high-pressure-side plate 103. This brush seal is configured so that the attachment portion 104b is interposed between the low-pressure-side plate 102 and the high-pressure-side plate 103 and so that outer circumferential portions of the both plates 102, 103 are coupled by a welding 105 to be integrated with each other (see, for example, Patent Citation 1). Further, as shown in FIG. 8, there is an example as a method of fixation for fixing the both plates 102, 103 by making the low-pressure-side plate 102 engaged with the high-pressure-side plate 103 by using a bolt 106 inserted axially in a state where the both plates 102, 103 are overlapped with each other (see, for example, Patent Citation 2).

CITATION LIST

Patent Literature

Patent Citation 1: Japanese Unexamined Patent Application Publication No. 2008-121512 (paragraph 0033, FIG. 1)
Patent Citation 2: Japanese Unexamined Patent Application Publication No. 2002-267023 (paragraph 0032, FIG. 1)

SUMMARY OF INVENTION

Technical Problem

The brush seal of Patent Citation 1 is configured so that the outer circumferential portions are coupled to each other in a state where ribs of the both plates 102, 103 are axially overlapped with each other. In addition, in order to prevent a relative positional deviation in a radial direction between the both plates 102, 103 at the time of coupling the plates 102, 103, it is necessary to use a jig for regulating positions of the both plates 102, 103. Further, in the case of coupling the plates by welding, the both plates 102, 103 are deformed in the radial direction by heat; therefore, a distance between the both plates 102, 103 and a rotor (not shown) arranged at an end of the brush 104a may depart from a desired range.

Furthermore, the brush seal of Patent Citation 2 is configured so that the both plates 102, 103 are fixed to each other by using the bolt 106 inserted axially in a state where the plates 102, 103 are overlapped with each other. Therefore, a large space occupied by a head portion of the bolt 106 is required. In addition, fastening of the bolt 106 loosens and therefore fixation between the both plates 102, 103 may be insufficient.

The present invention is made in view of these problems, and it is an object of the present invention to provide a brush seal which can surely fix a low-pressure-side plate and a high-pressure-side plate so that the low-pressure-side plate and the high-pressure-side plate are stably positioned.

Solution to Problem

In order to solve the foregoing problems, a brush seal having an annular shape, of the present invention is, in a first aspect, characterized by including: a low-pressure-side plate including a low-pressure-side recessed portion radially recessed and circumferentially extending; a high-pressure-side plate including a high-pressure-side recessed portion positioned to face the low-pressure-side recessed portion, the high-pressure-side recessed portion being radially recessed and circumferentially extending; a brush body including a plurality of wire rods, the brush body being supported between the low-pressure-side plate and the high-pressure-side plate; and a fixing member inserted into a space formed by the low-pressure-side recessed portion and the high-pressure-side recessed portion.

According to the first aspect, the fixing member is inserted into the space formed by the low-pressure-side recessed portion and the high-pressure-side recessed portion that are radially recessed and circumferentially extend; thereby, the fixing member as a key is inserted into the low-pressure-side recessed portion and the high-pressure-side recessed portion to be fixed therein. As a result, the low-pressure-side plate and the high-pressure-side plate can be surely fixed so as to be stably positioned in an axial direction.

The brush seal of the present invention is, in a second aspect, characterized by being a segmented-type brush seal which is circumferentially segmented, the low-pressure-side recessed portion and the high-pressure-side recessed portion respectively have bottoms.

According to the second aspect, the low-pressure-side recessed portion and the high-pressure-side recessed portion respectively have the bottoms. Therefore, an opening of the space formed by the low-pressure-side recessed portion and the high-pressure-side recessed portion is formed at a circumferential end of the low-pressure-side plate and the high-pressure-side plate. In addition, the low-pressure-side recessed portion and the high-pressure-side recessed portion have the bottoms, thereby preventing the fixing member from radially removing.

The brush seal of the present invention is, in a third aspect, characterized in that a plurality of the fixing members are inserted into the space formed by the low-pressure-side recessed portion and the high-pressure-side recessed portion.

According to the third aspect, the fixing members respectively have short circumferential lengths, therefore being easily inserted.

The brush seal of the present invention is, in a fourth aspect, characterized in that a radially outward side of the plurality of wire rods is covered by the high-pressure-side plate and the low-pressure-side plate.

According to the fourth aspect, at the radially outward side of the plurality of wire rods, an engagement portion relative to a radial direction is formed between the low-pressure-side plate and the high-pressure-side plate and a movement in the radial direction is restricted; therefore, mountability of the high-pressure-side plate relative to the low-pressure-side plate is increased.

The brush seal of the present invention is, in a fifth aspect, characterized in that the fixing member has a linear expansion coefficient greater than those of the low-pressure-side plate and the high-pressure-side plate.

According to the fifth aspect, the brush seal exposed to a sealed gas at high temperature during use is configured so that the fixing member largely expands compared to the low-pressure-side plate and the high-pressure-side plate; therefore, the low-pressure-side plate and the high-pressure-side plate can be further surely fixed by the brush seal.

BRIEF DESCRIPTION OF DRAWINGS

FIG. 3A illustrates a state before the brush seal is assembled; FIG. 3B illustrates a state where a low-pressure-side plate, a brush body, and a high-pressure-side plate are assembled to one another; and FIG. 3C illustrates a state where a fixing member is inserted in the brush seal;

DESCRIPTION OF EMBODIMENTS

Modes for carrying out a brush seal according to the present invention will be described below on the basis of embodiments.

First Embodiment

The brush seal according to a first embodiment will be described with reference to FIG. 1 to FIG. 4. Herein, a right to left direction on the sheet of FIG. 1, a direction radially oriented from a center O of FIG. 4A, and a direction oriented along a circumference at an equal distance from the center O will be respectively described as an axial direction, a radial direction, and a circumferential direction of the brush seal.

Figure 1:
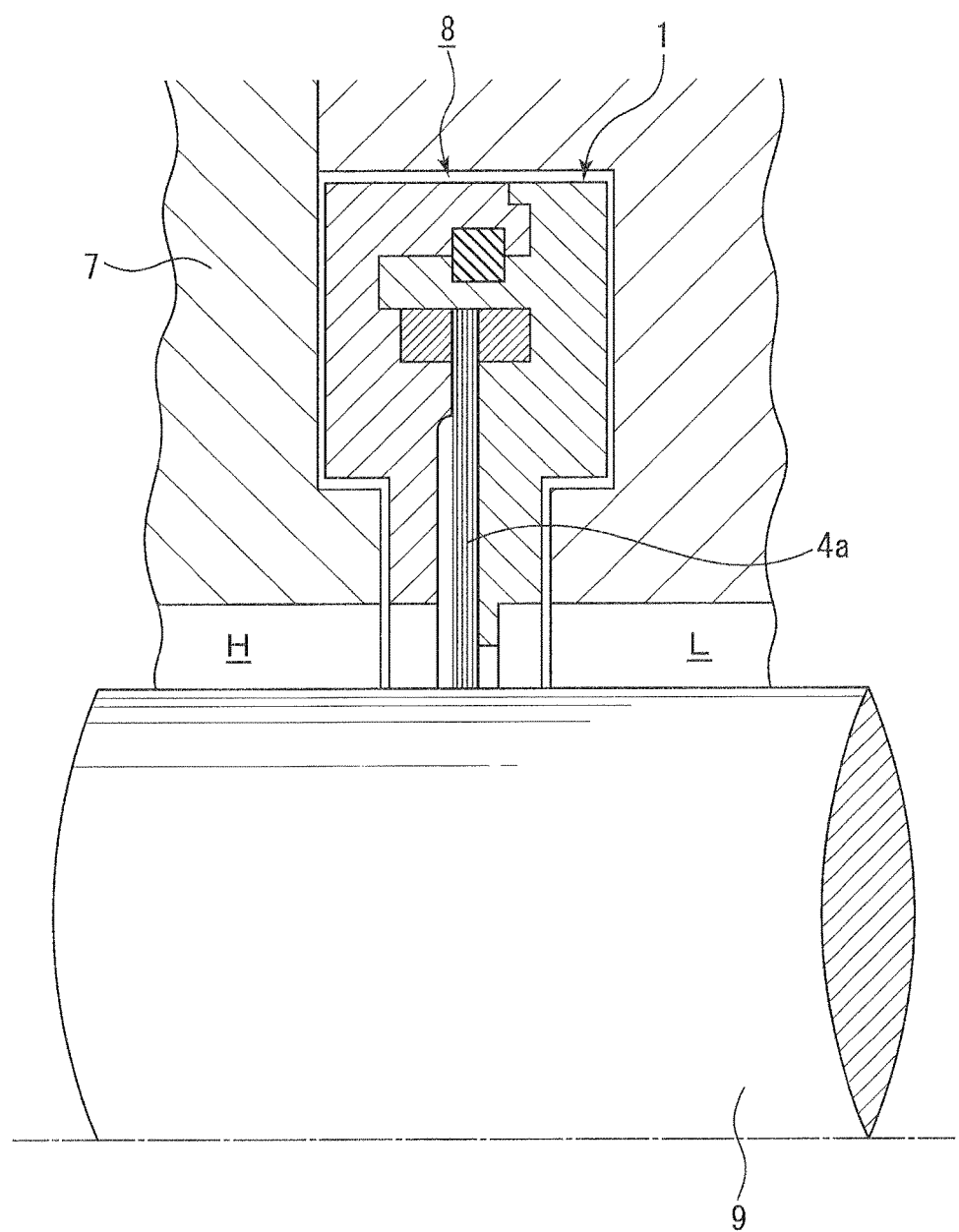
FIG. 1 is a cross-sectional view illustrating a state where a brush seal according to a first embodiment is mounted in a rotating machine.

FIG. 1 illustrates an example where a brush seal is mounted in a rotating machine such as a turbine. A brush seal 1 is arranged in a channel shaped housing portion 8 formed in a housing 7 of the rotating machine, and an end of a brush 4a of the brush seal 1 is provided adjacent to or in contact with a rotor 9 of the rotating machine; thereby, a sealed gas such as vapor and fuel gas in a high-pressure area H within the rotating machine is prevented from leaking to a low-pressure area L.

As shown in FIG. 4A, the brush seal 1 is divided into six segments 1A, 1A, 1B, 1B, 10, 10 in the circumferential direction and the segments are coupled to one another; therefore, the brush seal 1 is formed in an annular shape. For the purpose of illustration, FIG. 4A illustrates three types of segments 1A, 1B, 10 which differ from one another in arrangement and shape of a fixing member to be described later. However, preferably, one type of six segments provided with fixing members similar in arrangement and shape are coupled to one another to thereby configure the brush seal 1.

The brush seal 1 mainly includes a low-pressure-side plate 2, a high-pressure-side plate 3, a brush body 4, and a fixing member 5, and the brush body 4 mainly includes a brush 4a and an attachment portion 4b.

The brush 4a is made of a bunch of wires to be formed in a plate shape. The brush 4a is welded or crimped to the attachment portion 4b arranged at the outer circumferential side; thereby, the brush 4a and the attachment portion 4b are integrally coupled to each other and the cross-section thereof has substantially a hammer shape. Further, the brush 4a is formed by the wire having a wire diameter of 0.05 mm to 0.5 mm and made of a steel material, a nickel-base, cobalt-base, or another base alloy, or a ceramic material. Furthermore, the attachment portion 4b having an arc shape of about one sixth of a circle is made of a stainless material.

Next, assembling of the brush seal 1 and a structure of the both plates 2, 3 will be described in detail with reference to FIG. 3. Preferably, the both plates 2, 3 are made of a stainless material, a chrome steel material, or another material.

The low-pressure-side plate 2 mainly includes: a plate-shaped portion 21 extending in the radial direction and in the circumferential direction; a recessed groove 22 recessed in an axial direction of the plate-shaped portion 21 and extending in the circumferential direction; a rib 23 forming one side surface of the recessed groove 22, and protruded from the plate-shaped portion 21 in the axial direction and extending in the circumferential direction; a recessed groove 24 (low-pressure-side recessed portion) provided at an outer side of the rib 23 in the radial direction to be recessed inward in the radial direction and extending in the circumferential direction; a recessed groove 25 having one side surface, which is formed by the rib 23, being recessed in the axial direction of the plate-shaped portion 21, and extending in the circumferential direction; and a protruded portion 26 forming one side surface of the recessed groove 25 and a portion of an outer circumferential surface 27 of the plate-shaped portion 21, and protruded from the plate-shaped portion 21 in the axial direction and extending in the circumferential direction.

The high-pressure-side plate 3 mainly includes: a plate-shaped portion 31 extending in the radial direction and in the circumferential direction; a stepped portion 32 recessed in an axial direction of the plate-shaped portion 31 and extending in the circumferential direction; a recessed groove 33 further recessed from the stepped portion 32 in the axial direction and extending in the circumferential direction; a rib 34 forming one side surface of the recessed groove 33 and one surface of an outer circumferential surface 38, and protruded from the plate-shaped portion 31 in the axial direction and extending in the circumferential direction; a recessed groove 35 (high-pressure-side recessed portion) provided at an inner side of the rib 34 in the radial direction to be recessed outward in the radial direction and extending in the circumferential direction; and a protruded portion 36 provided at an end of the rib 34 in the axial direction, cut out to form a stepped portion 37, and extending in the circumferential direction. The stepped portion 37 is provided at an outer side in the radially direction to be recessed in the axial direction.

An assembling procedure of the brush seal 1 is as follows.

[Step 1] The attachment portion 4b provided at one side of the brush 4a is fitted into the recessed groove 22 of the low-pressure-side plate 2 (FIG. 3A).

Figure 3:
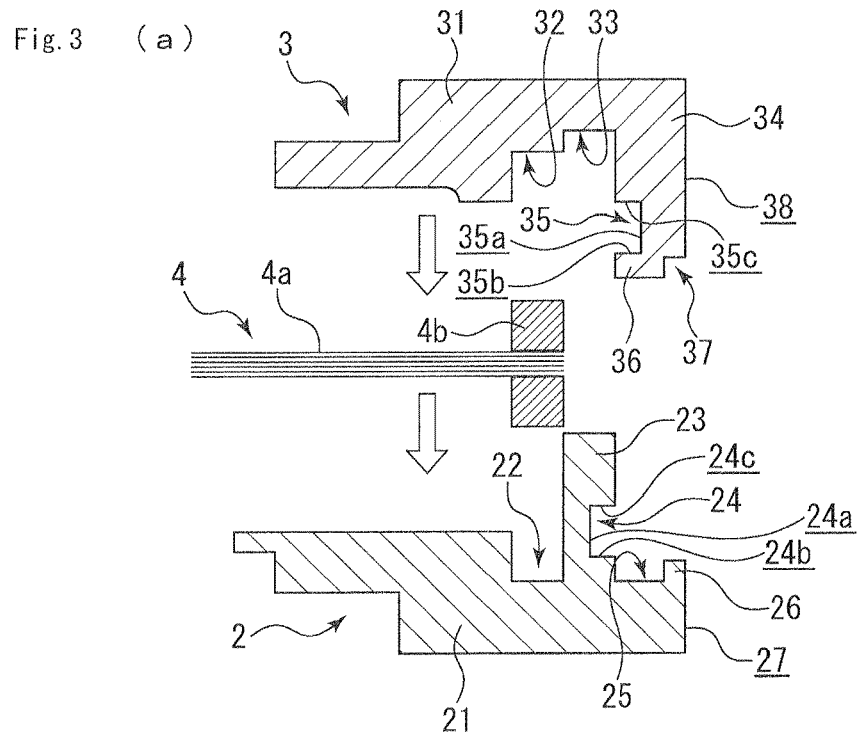
FIG. 3 is a cross-sectional view explaining assembling of the brush seal of the first embodiment.
Figure 3:
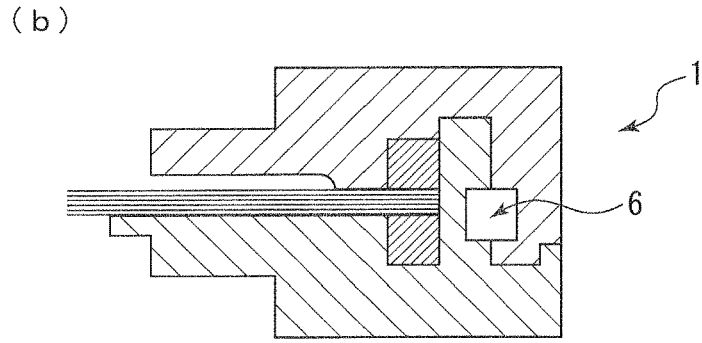
Figure 3:
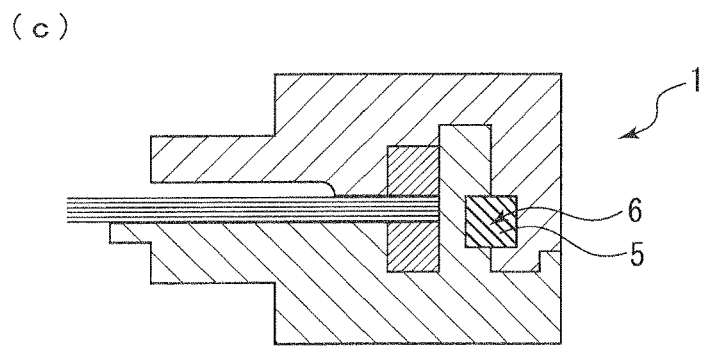
Figure 4:
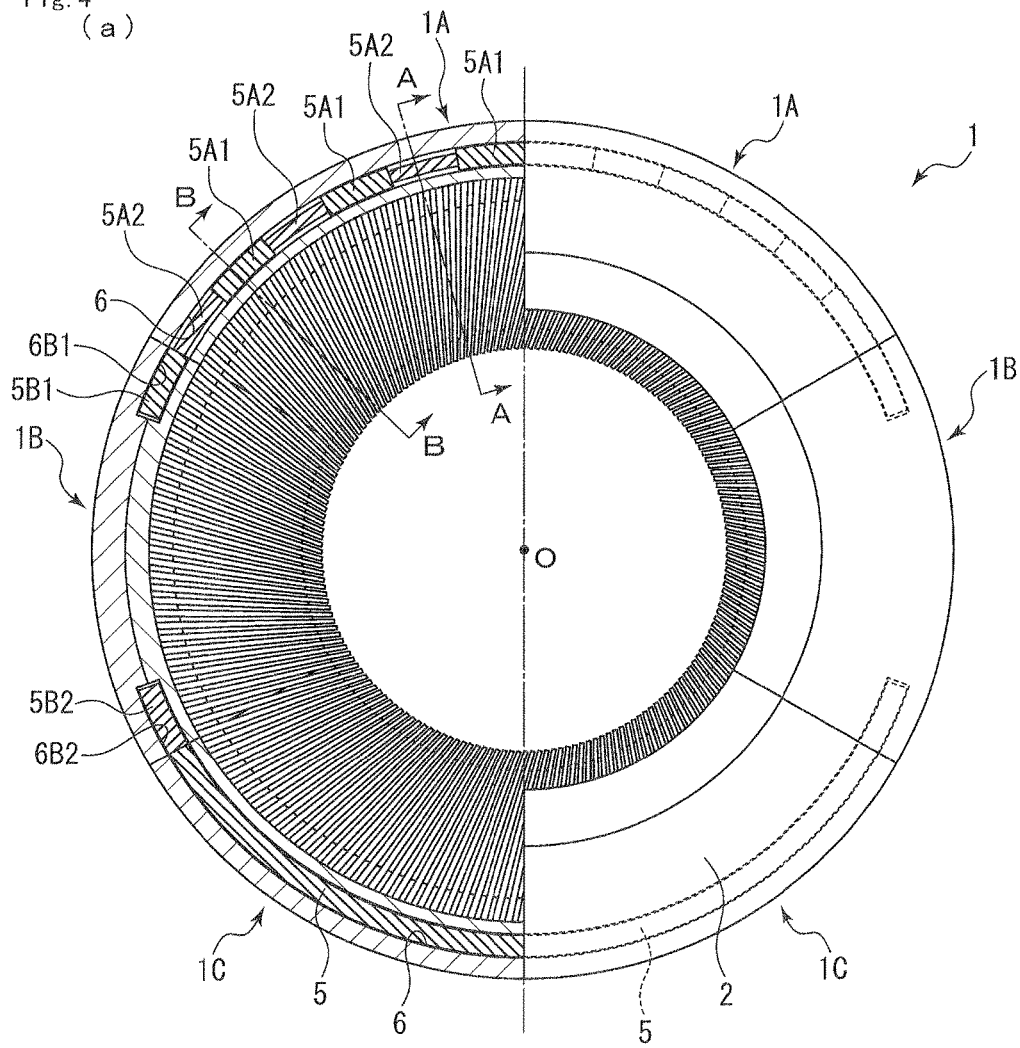
FIG. 4A is a partially cutaway side view illustrating a portion of the brush seal of the first embodiment.
FIG. 4B is a cross-sectional view taken along the A-A line of FIG. 4A.
FIG. 4C is a cross-sectional view taken along the B-B line of FIG. 4A.
Figure 4:
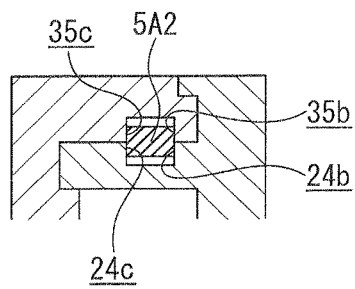
Figure 4:
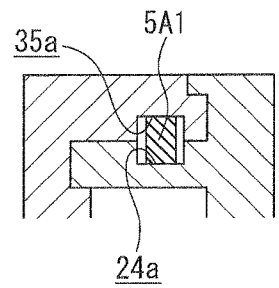

[Step 2] Next, the high-pressure-side plate 3 is overlapped with the low-pressure-side plate 2 from the upper side in FIG. 3, and the rib 23 is fitted into the recessed groove 33 and the protruded portion 36 is fitted into the recessed groove 25 (FIG. 3A). In addition, the rib 23 and the protruded portion 36 have dimensional relations (loosely-fit relations) with the recessed groove 33 and the recessed groove 25, respectively, when being fitted into the recessed groove 33 and the recessed groove 25, i.e. small clearances are respectively generated between the rib 23 and the recessed groove 33 and between the protruded portion 36 and the recessed groove 25. Moreover, these portions have the loosely-fitting relation, therefore being easily fitted to each other. However, in order to achieve tight fixation, these portions may be press-fitted to each other.

In a state where the rib 23 and the protruded portion 36 are fitted into the recessed groove 33 and the recessed groove 25, respectively, the attachment portion 4b of the brush 4a is housed in a space formed by the rib 23 and the stepped portion 32 (FIG. 3B). In addition, the recessed groove 24 and the recessed groove 35 are positioned so as to face each other, and both side surfaces 24b, 24c provided in a standing manner from a bottom surface 24a of the recessed groove 24 are respectively substantially in plane with both side surfaces 35b, 35c provided in a standing manner from a bottom surface 35a of the recessed groove 35. Thus, a space 6 having a rectangular shape in cross-section is formed by the recessed groove 24 and the recessed groove 35.

[Step 3] When the brush seal is in a state shown in FIG. 3B, the fixing member 5 having substantially the same shape as the shape of the space 6 is inserted into the space 6 in the circumferential direction (in a direction perpendicular to the sheet in FIG. 3) (FIG. 3C).

Here, the fixing member 5 has a loosely-fit relation with the space 6, i.e. a small clearance is generated between the fixing member 5 and the space 6 when the fixing member 5 is inserted into the space 6. In addition, the fixing member 5 having an arc shape of about one sixth of a circle may be preferably made of a material which has a linear expansion coefficient greater than those of the both plates 2, 3 made of a stainless material, a chrome steel material, or another material. Such material is selected as the material of the fixing member; thereby, the brush seal 1 expands due to a temperature of a sealed gas when in use. However, since an expansion amount of the fixing member 5 is greater than those of the both plates 2, 3, the fixing member 5 may be tightly fitted into the space 6 without clearance therebetween. Accordingly, the both plates 2, 3 can be fixed by the fixing member 5 without loosening in the axial direction. In addition, the fixing member 5 is loosely fitted into the space 6 and therefore can be easily fitted into the space 6. However, in order to achieve tight fixation, the fixing member 5 may be press-fitted into the space 6.

Moreover, the both plates 2, 3 are fixed in the radial direction by engagement between the rib 23 and the recessed groove 33 and by fitting of the protruded portion 36 into the recessed groove 25.

As described above, the fixing member 5 as a key is inserted into the recessed groove 24 and the recessed groove 35 to be fixed therein; thereby, the low-pressure-side plate 2 and the high-pressure-side plate 3 can be surely fixed so as to be stably positioned in the axial direction. In addition, positions of the low-pressure-side plate 2 and the high-pressure-side plate 3 can be easily determined.

Further, shear forces from the recessed grove 24 at a low-pressure side and the recessed groove 35 at a high-pressure side act on the fixing member 5 in the axial direction. Meanwhile, the fixing member 5 is configured so that a length in the circumferential direction is longer than lengths in the axial direction and the radial direction. In addition, the length of the fixing member 5 in the circumferential direction is long; therefore, a shear force per unit length in the circumferential direction, based on the shear forces acting on the fixing member 5, is small. Thus, the length of the fixing member 5 in the radial direction may be short. As a result, the brush seal 1 can be compactly configured.

Furthermore, the recessed groove 24 and the recessed groove 35 respectively include bottoms having the bottom surfaces 24a, 35a. Therefore, an opening of the space 6 formed by the recessed groove 24 and the recessed groove 35 is formed at a circumferential end of the low-pressure-side plate 2 and the high-pressure-side plate 3. In addition, the recessed groove 24 and the recessed groove 35 have the bottoms; therefore, the fixing member does not remove in the radial direction. Moreover, the recessed groove 24, the recessed groove 35, and the fixing member 5 are not exposed to the outer side of the low-pressure-side plate 2 and the high-pressure-side plate 3 in the radial direction. Consequently, high flexibility in designing outer circumferential shapes of the low-pressure-side plate 2 and the high-pressure-side plate 3 is provided in the radial direction. As a result, a clearance between the brush seal 1 and the housing portion 8 of the housing 7 in which the brush seal 1 is to be mounted can be easily established. In addition, when the outer circumferential surface 27 and the outer circumferential surface 38 are fitted to each other, an outer circumference of the brush seal 1 can be flat and flush.

Furthermore, the outer side of the brush 4a and the attachment portion 4b in the radial direction is covered by the rib 23 and the rib 34, i.e. by the both plates 2, 3. An engagement portion relative to the radial direction is formed between the rib 23 and the rib 34 and a movement in the radial direction is restricted; therefore, mountability of the high-pressure-side plate 3 relative to the low-pressure-side plate 2 is increased.

Further, as in the segment 10 (FIG. 4A) where the fixing member 5 and the space 6 have substantially the same shape, the fixing member 5 is arranged in the space 6 so as to extend in the circumferential direction; therefore, the both plates 2, 3 can be firmly fixed.

Furthermore, as in the segment 1A, plural fixing members 5A1, 5A2, 5A1, 5A2, 5A1, 5A2 may be arranged in the single space 6. In this case, lengths of the fixing members 5A1, 5A2 in the circumferential direction are respectively short, therefore being easily inserted. In addition, the fixing members 5A1, 5A2 may have the same shape but may have different cross-sectional shapes. The fixing member 5A2 has the shape so as to be surely in contact with the side surfaces 24b, 35b, 24c, 35c (FIG. 4B), and the fixing member 5A1 has the shape so as to be surely in contact with the bottom surfaces 24a, 35a (FIG. 4C). Therefore, the fixing members 5A2, 5A1 can perform an effect to surely restrict loosening in the axial direction and in the radial direction.

Further, as in the segment 1B, the recessed grooves 24, 35 formed in the both plates 2, 3 are configured so as to extend halfway in the circumferential direction, and fixing members 5B1, 5B2 may be respectively fitted into spaces 6B1, 6B2 formed by these recessed grooves 24, 35. With the structure just described, the fixing members 5B1, 5B2 are inserted into the segment 1B so as to be fitted only to both ends thereof in the circumferential direction; therefore, the fixing members 5B1, 5b2 can be easily mounted.

Furthermore, as shown in FIG. 4A, in a case where the six segments are coupled to configure the brush seal 1 having the annular shape, circumferential end sections of the respective segments are provided adjacent to or in contact with each other. In addition, the fixing members 5, 5A1, 5A2, 5B1, 5B2 are inserted in the circumferential direction of the both plates 2, 3. Accordingly, even if the fixing members 5, 5A1, 5A2, 5B1, 5B2 may move in the circumferential direction when the brush seal is in use, the fixing member in one segment makes contact with the circumferential end section of the other segment next to the one segment (or with the fixing member in the other segment next to the one segment), therefore being prevented from removing.

Figure 2:
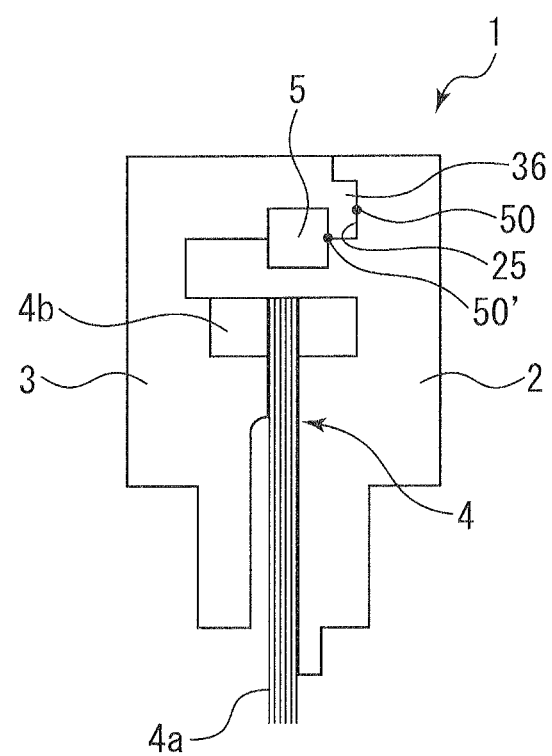
FIG. 2 is a front view illustrating a circumferential end section of the brush seal of the first embodiment.

Further, it does not matter where welding is applied; however, for example, as shown in FIG. 2, the recessed groove 25 and the protruded portion 36 are spot-welded via a location 50 on the circumferential end section to be coupled to each other, thereby further surely fixed to each other. In addition, three members of the fixing member 5, 5A1, 5A2, 5B1, 5B2, and the low-pressure-side plate 2, and the high-pressure-side plate 3 are spot-welded via a location 50' in which the three members are to be in contact with one another, thereby further surely fixed to one another.

Furthermore, an example where the brush body 4 is mounted to the low-pressure-side plate 2 and thereafter the high-pressure-side plate 3 is mounted to the low-pressure-side plate 2 in the axial direction is explained as the assembling procedure of the brush seal 1. Alternatively, the high-pressure-side plate 3 may be rotated in the circumferential direction to be assembled. Moreover, an assembling order may be as follows. The brush body 4 is mounted to the high-pressure-side plate 3 and thereafter the low-pressure-side plate 2 is mounted.

Second Embodiment

Figure 5:
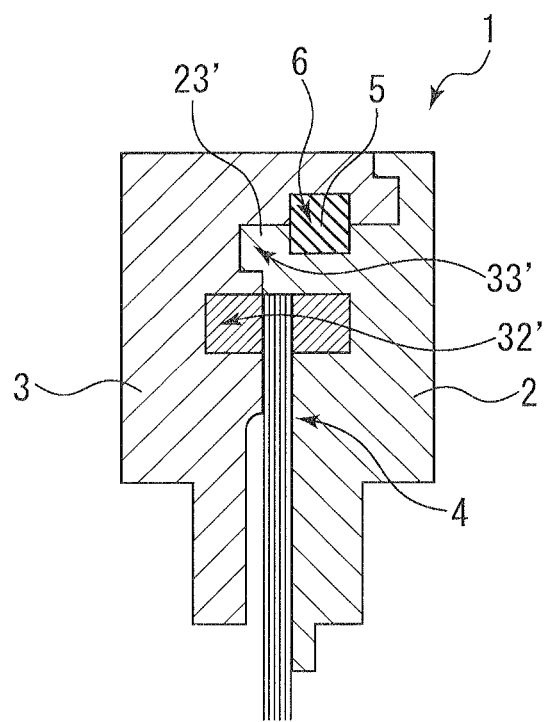
FIG. 5 is a cross-sectional view of the brush seal according to a second embodiment.

Next, the brush seal according to a second embodiment will be described with reference to FIG. 5. A rib 23' of the low-pressure-side plate 2 is short, and a recessed groove 32' and a recessed groove 33' for fitting the attachment portion 4b and the rib 23' are formed in the high-pressure-side plate 3. In addition, other configurations are similar to those of the first embodiment and therefore will not be explained. The rib 23' and the attachment portion 4b adjacent to the high-pressure-side plate 3 are fitted into the recessed groove 33' and the recessed groove 32', respectively; therefore, a stable structure for assembling may be obtained.

Third Embodiment

Figure 6:
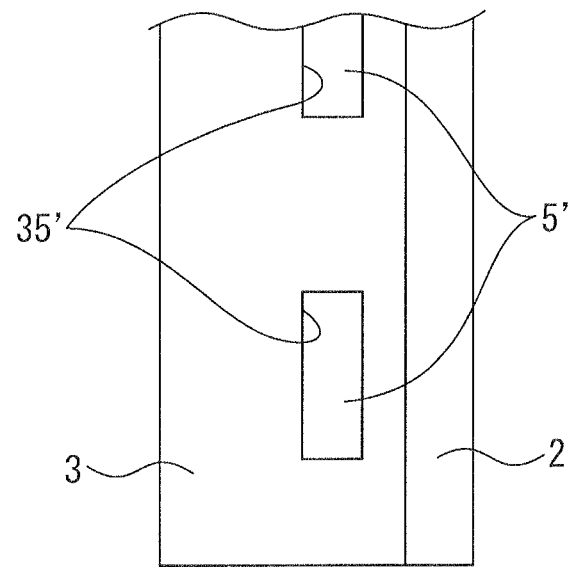
FIG. 6A is a front view of the brush seal according to a third embodiment and FIG. 6B is a cross-sectional view of the brush seal of the third embodiment.
Figure 6:
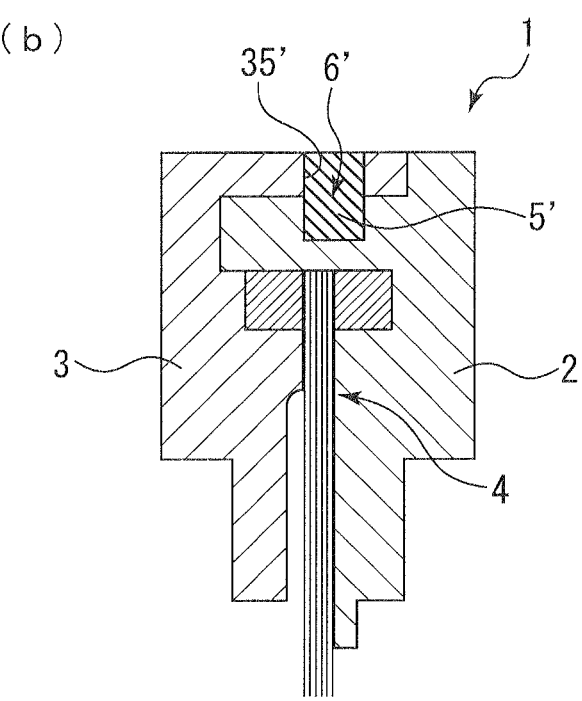
Figure 7:
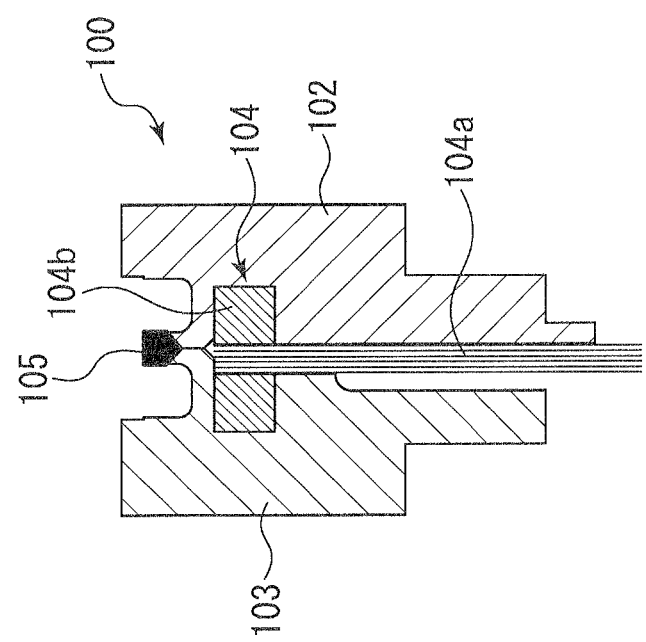
FIG. 7 is a cross-sectional view of a conventional brush seal.
Figure 8:
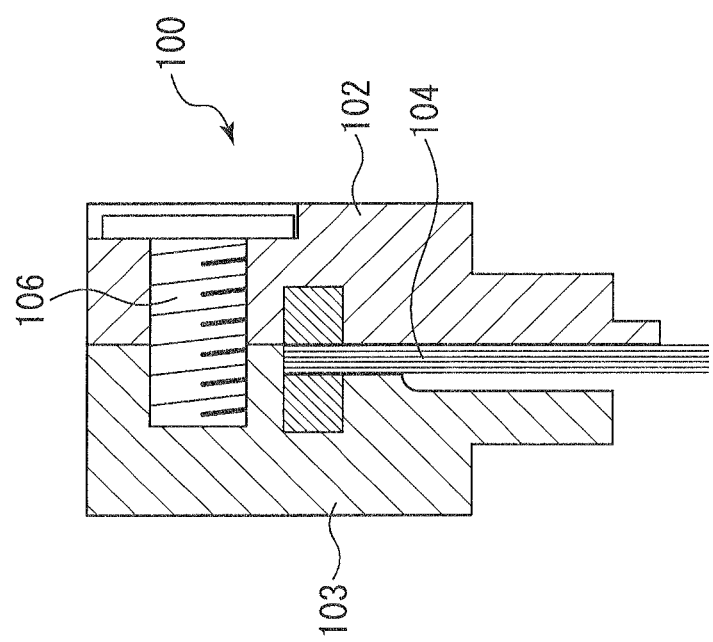
FIG. 8 is a cross-sectional view of another conventional brush seal.

Next, the brush seal according to a third embodiment will be described with reference to FIG. 6. In the first embodiment, the recessed groove 35 opened to the circumferential end section includes the bottom having the bottom surface 35a. Alternatively, in the third embodiment, a recessed groove 35' without a bottom is a through-hole which is opened to a radially outward end section. Further, a fixing member 5' is fitted into a space 6' from the radially outward side. In addition, other configurations are similar to those of the first embodiment and therefore will not be explained.

The fixing member 5' is inserted from the radially outward side; therefore, an inserting operation is easily performed. Moreover, the brush seal of the third embodiment can be applied to an integral-type annular brush seal other than a segmented-type brush seal.

As above, the embodiments are described on the basis of the drawings; however, concrete configurations are not limited to these embodiments. Alternatively, changes or additions without departing from the scope of the present invention can be included in the present invention.

For example, in the foregoing embodiments, an example where the rotor 9 at the inner circumferential side of the brush seal 1 is sealed is explained. Alternatively, the present invention may be applied to a case where the rotor at the outer circumferential side of the brush seal is sealed. In this case, a radially outward end of the brush is configured to be adjacent to or in contact with the rotor.

In addition, the structure in which the rib 34 of the high-pressure-side plate 3 is arranged at the outer side of the rib 23 of the low-pressure-side plate 2 in the radial direction is explained. Alternatively, the rib of the low-pressure-side plate may be arranged at the outer side of the rib of the high-pressure-side plate in the radial direction.

REFERENCE SIGNS LIST

1 Brush seal
2 Low-pressure-side plate
3 High-pressure-side plate
4 Brush body
4a Brush
4b Attachment portion
5, 5A1, 5A2, 5B1, 5B2, 5' Fixing member
6, 6B1, 6B2, 6' Space
24 Recessed groove (low-pressure-side recessed portion)
35, 35' Recessed groove (high-pressure-side recessed portion)
H High-pressure area
L Low-pressure area

The invention claimed is:

1. A brush seal having an annular shape, comprising:
a low-pressure-side plate including a low-pressure-side recessed portion radially recessed and circumferentially extending;
a high-pressure-side plate including a high-pressure-side recessed portion positioned to face the low-pressure-side recessed portion, the high-pressure-side recessed portion being radially recessed and circumferentially extending;
a brush body including a plurality of wire rods, the brush body being supported between the low-pressure-side plate and the high-pressure-side plate; and
a fixing member inserted into a space formed by the low-pressure-side recessed portion and the high-pressure-side recessed portion in a circumferential direction.

2. The brush seal according to claim 1, comprising a segmented-type brush seal which is circumferentially segmented, wherein the low-pressure-side recessed portion and the high-pressure-side recessed portion respectively have bottoms.

3. The brush seal according to claim 2, wherein a plurality of the fixing members are inserted into the space formed by the low-pressure-side recessed portion and the high-pressure-side recessed portion.

4. The brush seal according to claim 3, wherein the fixing member has a linear expansion coefficient greater than those of the low-pressure-side plate and the high-pressure-side plate.

5. The brush seal according to claim 2, wherein a radially outward side of the plurality of wire rods is covered by the high-pressure-side plate and the low-pressure-side plate.

6. The brush seal according to claim 5, wherein the fixing member has a linear expansion coefficient greater than those of the low-pressure-side plate and the high-pressure-side plate.

7. The brush seal according to claim 2, wherein the fixing member has a linear expansion coefficient greater than those of the low-pressure-side plate and the high-pressure-side plate.

8. The brush seal according to claim 7, wherein the fixing member has a linear expansion coefficient greater than those of the low-pressure-side plate and the high-pressure-side plate.

9. The brush seal according to claim 1, wherein a plurality of the fixing members are inserted into the space formed by the low-pressure-side recessed portion and the high-pressure-side recessed portion.

10. The brush seal according to claim 9, wherein a radially outward side of the plurality of wire rods is covered by the high-pressure-side plate and the low-pressure-side plate.

11. The brush seal according to claim 10, wherein the fixing member has a linear expansion coefficient greater than those of the low-pressure-side plate and the high-pressure-side plate.

12. The brush seal according to claim 9, wherein the fixing member has a linear expansion coefficient greater than those of the low-pressure-side plate and the high-pressure-side plate.

13. The brush seal according to claim 12, wherein the fixing member has a linear expansion coefficient greater than those of the low-pressure-side plate and the high-pressure-side plate.

14. The brush seal according to claim 1, wherein a radially outward side of the plurality of wire rods is covered by the high-pressure-side plate and the low-pressure-side plate.

15. The brush seal according to claim 14, wherein the fixing member has a linear expansion coefficient greater than those of the low-pressure-side plate and the high-pressure-side plate.

16. The brush seal according to claim 15, wherein the fixing member has a linear expansion coefficient greater than those of the low-pressure-side plate and the high-pressure-side plate.

17. The brush seal according to claim 1, wherein the fixing member has a linear expansion coefficient greater than those of the low-pressure-side plate and the high-pressure-side plate.

* * * * *